United States Patent
Lee et al.

(10) Patent No.: US 8,368,548 B2
(45) Date of Patent: Feb. 5, 2013

(54) WIRELESS HEADSET AND BATTERY STATUS INDICATION METHOD THEREOF

(75) Inventors: Geun Myeon Lee, Suwon-si (KR); Sung Hak Jang, Seongnam-si (KR); Hee Young Kim, Seoul (KR)

(73) Assignee: Samsung Electronics Co., Ltd., Swuon-si (KR)

( * ) Notice: Subject to any disclaimer, the term of this patent is extended or adjusted under 35 U.S.C. 154(b) by 232 days.

(21) Appl. No.: 12/276,765

(22) Filed: Nov. 24, 2008

(65) Prior Publication Data
US 2009/0135017 A1    May 28, 2009

(30) Foreign Application Priority Data
Nov. 26, 2007  (KR) .................. 10-2007-0120662

(51) Int. Cl.
*G08B 21/00* (2006.01)
(52) U.S. Cl. ..................... 340/636.1; 320/127
(58) Field of Classification Search .......... 320/127, 320/128, 134, 136; 340/540, 636.1, 636.15, 340/641
See application file for complete search history.

(56) References Cited

U.S. PATENT DOCUMENTS

| | | | | |
|---|---|---|---|---|
| 4,419,749 A * | 12/1983 | Nokihara et al. | ............... | 369/11 |
| 5,656,919 A * | 8/1997 | Proctor et al. | ................ | 320/153 |
| 7,362,005 B2 * | 4/2008 | Leblanc | ....................... | 307/10.1 |
| 7,548,747 B2 * | 6/2009 | Yang | ............................. | 455/418 |
| 7,671,756 B2 * | 3/2010 | Herz et al. | .................... | 340/669 |
| 2006/0135218 A1* | 6/2006 | Son et al. | ...................... | 455/573 |
| 2009/0029743 A9* | 1/2009 | Lair et al. | ................... | 455/569.1 |

\* cited by examiner

*Primary Examiner* — George Bugg
*Assistant Examiner* — Edny Labbees
(74) *Attorney, Agent, or Firm* — Jefferson IP Law, LLP

(57) ABSTRACT

An enhanced wireless headset and battery status indication method is provided for indicating an accurate battery level of a wireless headset. A battery status indication method for a wireless headset determines a residual charge of a battery of the wireless headset and emits light having one of a plurality of colors from a status indication unit of the wireless headset. Each of the plurality of colors indicates a different residual charge of the battery. The wireless headset and battery status indication method also enables indicating whether the wireless headset is operating in charging mode by maintaining or blinking the battery status indication light. In addition, the wireless headset and battery status indication method enables indicating a radio communication status as well as a battery status by blinking the battery status indication light in correspondence with a communication radio scanning cycle.

24 Claims, 4 Drawing Sheets

WIRELESS HEADSET AND BATTERY STATUS INDICATION METHOD THEREOF

PRIORITY

This application claims the benefit under 35 U.S.C. §119(a) of a Korean patent application filed in the Korean Intellectual Property Office on Nov. 26, 2007 and assigned Serial No. 10-2007-0120662, the entire disclosure of which is hereby incorporated by reference.

BACKGROUND OF THE INVENTION

1. Field of the Invention

The present invention relates to a wireless headset. More particularly, the present invention relates to an enhanced wireless headset and battery status indication method for the wireless headset.

2. Description of the Related Art

The trend of integration of various functions and technologies into mobile phones has promoted peripheral device and accessory markets. In particular, with the integration of a short range wireless communication technology, such as Bluetooth, and multimedia functions into the mobile device, the wireless headset is becoming an increasingly popular peripheral device.

Typically, the wireless headset is battery-powered due to its wireless feature, whereby battery status monitoring is used for safe and reliable use of the wireless headset. However, the wireless headset is limited in size and therefore is not typically implemented with a sophisticated indication display unit. For this reason, most wireless headsets use a light emission device such as Light Emitting Diode (LED) for indicating battery charging status and radio status.

However, the conventional LED battery status indicator cannot indicate the residual battery charge. Instead, the conventional LED battery status indicator only indicates a low battery state, resulting in a dead battery and frustration to the user. In addition, since the current battery level is not able to be determined, the user frequently charges the battery regardless of the current battery level, resulting in inconvenience to the user.

SUMMARY OF THE INVENTION

An aspect of the present invention is to address at least the above-mentioned problems and/or disadvantages and to provide at least the advantages described below. Accordingly, an aspect of the present invention is to provide an enhanced wireless headset and battery status indication method for the wireless headset that is capable of displaying accurate current battery level.

Another aspect of the present invention is to provide an enhanced wireless headset and battery status indication method thereof that is capable of indicating whether the wireless headset is operating in a charging mode or an non-charging mode by continuing or blinking a battery status indication light.

Further, another aspect of the present invention is to provide an enhanced wireless headset and battery status indication method thereof that is capable of indicating a radio communication status as well as a battery status.

In accordance with an exemplary embodiment of the present invention, a battery status indication method for a wireless headset is provided. The method includes determining a residual charge of a battery of the wireless headset and emitting light having one of a plurality of colors from a status indication unit of the wireless headset, wherein each of the plurality of colors indicate a different residual charge of the battery.

In accordance with another exemplary embodiment of the present invention, a wireless headset is provided. The method includes a wireless communication unit for establishing a short range wireless communication link with an external device, a control unit for controlling the wireless communication with the external device and for determining a residual battery charge of the wireless headset, and a status indication unit including a first light emitting device for emitting one of a plurality of colors of light based on a result of the determination of the residual battery charge, wherein each of the plurality of colors corresponds to a different residual battery charge.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawing, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First Exemplary Embodiment

Figure 1:
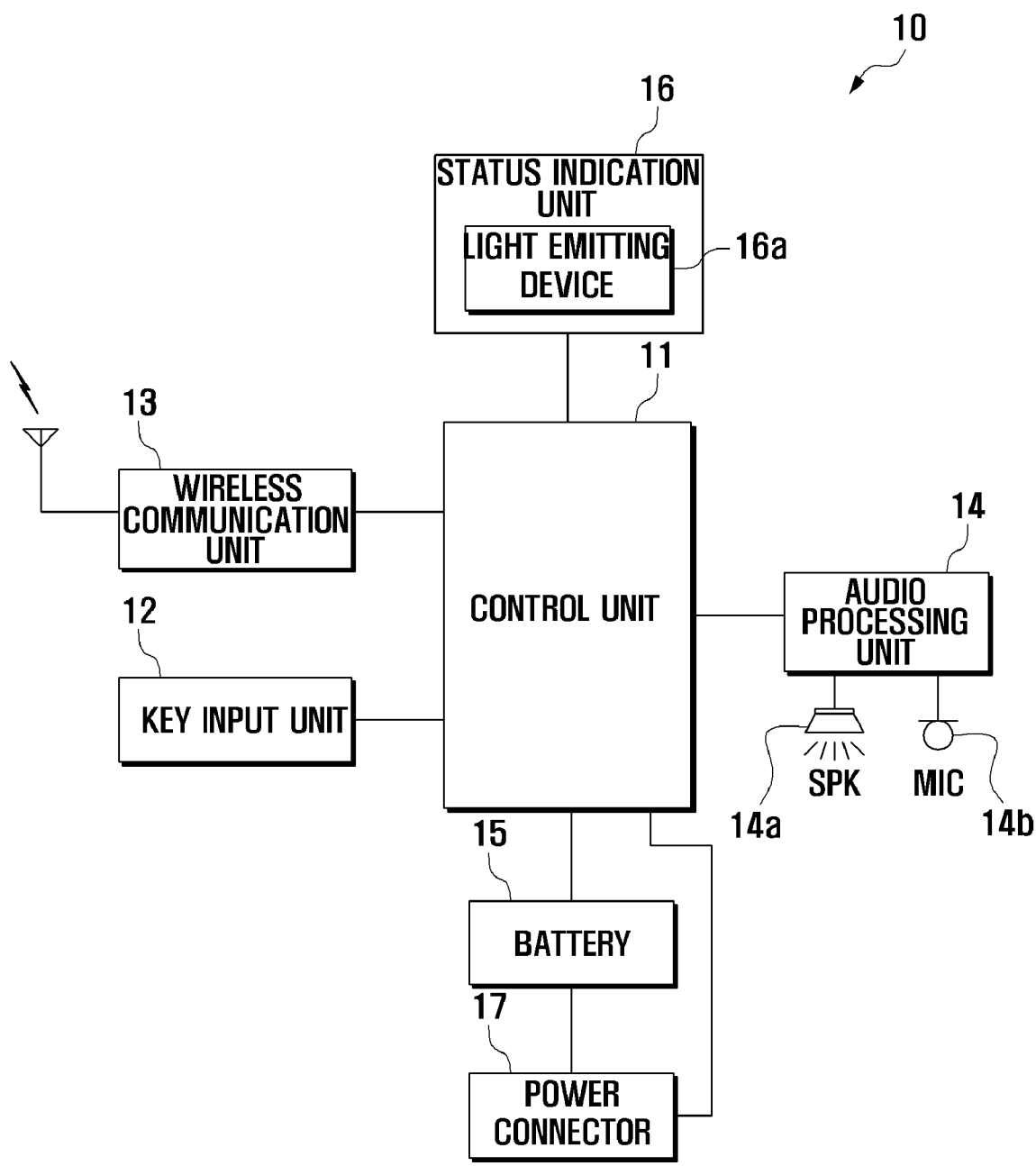
FIG. 1 is a block diagram illustrating a configuration of a wireless headset according to an exemplary embodiment of the present invention.
Figure 2:
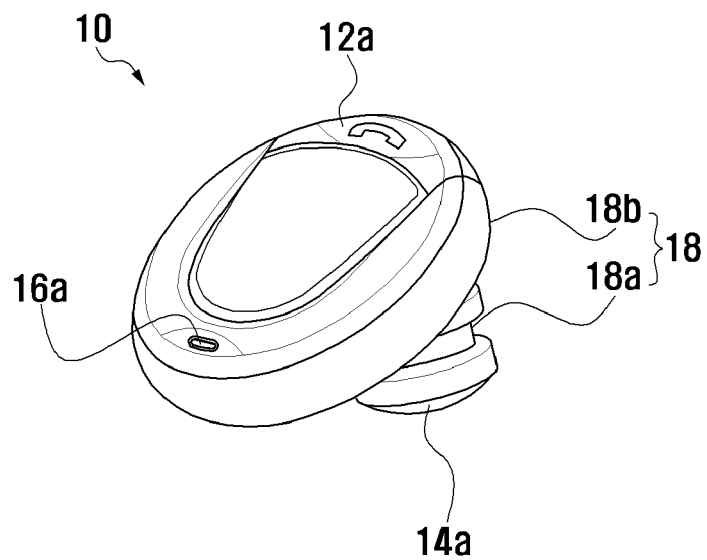
FIG. 2 is a perspective view illustrating the wireless headset of FIG. 1.

FIG. 1 is a block diagram illustrating a configuration of a wireless headset according to an exemplary embodiment of the present invention, and FIG. 2 is a perspective view illustrating the wireless headset of FIG. 1.

Referring to FIGS. 1 and 2, the wireless headset 10 includes a control unit 11, a key input unit 12, a wireless communication unit 13, an audio processing unit 14, a battery 15, a status indication unit 16, and a power connector 17, housed in a casing 18.

The casing 18 may be contoured to be worn on an ear and may include an ear bud 18a for insertion into an ear canal and a supporting part 18b from which the ear bud 18a may protrude. When the wireless headset 10 is worn by a user, supporting part 18b may supportably contact an ear rim. The ear bud 18a may include a speaker 14a which is electrically connected to the audio processing unit 14. The supporting part 18b may include a microphone 14b which may be electrically connected to the audio processing unit 14.

The control unit 11 may be a microprocessor for controlling operations of the wireless headset 10. The control unit 11 may control communication with a portable device and a battery status indication display. The battery status may show a residual battery level and a low battery state.

The key input unit 12 may be provided with one or more keys 12a for manipulating the wireless headset 10 and may send a key signal generated by key selection to the control unit 11. The one or more keys 12a of the key input unit 12 may be mounted on an external surface of the supporting part 18b.

The wireless communication unit 13 may be responsible for wireless communication with an external device supporting the same communication protocol as that utilized by the wireless headset 10. The wireless communication unit 13 may scan external devices periodically and may perform pairing with the external devices within scanning range under the control of the control unit 11. After being paired with a device, the wireless communication unit 13 may perform scanning periodically.

The audio processing unit 14 may process the audio signal received from the control unit 11 and may output the processed audio signal through the speaker 14a in the form of audible sound wave. The audio processing unit 14 may also process the sound wave input through the microphone 14b and may output the processed sound wave to the control unit 11 in the form of an audio signal.

The battery 15 may supply power to one or more of the internal elements of the wireless headset 10 and may be connected to a power source via the power connector 17 to be charged. At this time, the control unit 11 can monitor the battery charging status.

The status indication unit 16 may be provided with a light emitting device 16a emitting at least three different colors of light for indicating battery status and radio status. The light emitting device 16a may be mounted so as to be exposed outside the casing 18 such that the light emitted by the light emitting device 16a catches a user's attention. Accordingly, the user can determine the current battery status and radio status based on the color of light emitted by the light emitting device 16a. For this purpose, the light emitting device 16a may be mounted on a wall of the casing 18 opposed to the supporting part 18b.

The light emitting device 16a can be implemented with Light Emitting Diodes (LEDs). The light emitting device 16a can be implemented with two single color LEDs emitting different colors of light or one three color LED which can emit three different colors of light. In the former case, the two single color LEDs may emit different colors of light using indirect illumination such that, when the two single color LEDs turn on simultaneously, a third color light is emitted. In the latter case, each of the three colors LED may be implemented by combining two different color LEDs such that, each two color LED can emit two different colors of light and, when two of the two color LEDs turn on, a combined color of light is emitted that is another color of light. When using the three color emitting LEDs, the light emitting device 16a can be implemented via indirect or direct illumination.

For example, the status indication unit 16 can be implemented with any two of blue, red, and green light emitting devices. In a case of using blue and red light emitting devices, a purplish red light can be generated by turning on the blue and red light emitting devices simultaneously. In a case of using red and green light emitting devices, turning on the red and green light emitting devices emits a yellow color light. In the same manner, a combination of the blue and green light emitting devices can generate a bluish green light. These combined color lights are emitted when the two light emitting devices are controlled to emit lights at the same brightness. Accordingly, various color lights can be expressed by controlling the respective brightness of the lights emitted by the two different color lights emitting devices.

More particularly, the control unit 11 checks the residual charge of the battery 15 and controls the status indication unit 16 to emit a color of light corresponding to the current residual battery charge. That is, the status indication unit 16 is configured to emit different colors of light that may be matched to the residual battery levels.

The control unit 11 can control such that, when the power connector 17 is connected to the power source, the light emitting device 16a may be switched on or switched on and off for indicating the battery charging status.

The control unit 11 may control such that the light emitting device 16a lights up or switches on and off for indicating a battery charging status. In a case where an external power supply is detected, the control unit 11 may control the light emitting device 16a to light up to inform the user of the battery charging status. When no external power supply is detected, the control unit 11 may control the light emitting device 16a to switch on and off to indicate a non-charging status. A non-charging status refers to state where the wireless headset 10 consumes battery power.

The control unit 11 may also control such that light emitting device 16a indicates the current radio status of the wireless communication unit 13. When the wireless headset 10 is in a non-charging mode, the control unit 11 may control such that the light emitting device 16a switches on an off, i.e. blinks the light, in correspondence with the radio scanning cycle of the wireless communication unit 13.

Table 1 shows the light emission patterns of the status indication unit 16. In this exemplary embodiment, the status indication unit 16 may be implemented with a light emitting device 16a that is capable of emitting blue, red, and purplish red lights.

TABLE 1

| Battery level | Non-charging mode | Charging mode |
|---|---|---|
| High | Blink blue light | Blue light |
| Middle | Blink purplish red light | Purplish red light |
| Low | Blink red light | Red light |

Although the battery status indication device is described in association with a wireless mono headset as depicted in FIG. 2, the present invention is not limited thereto. For example, the battery status indication device can be applied to a wireless stereo headset or the like. A battery status indication method operating with the above-described wireless headset is described hereinafter with reference to FIGS. 1 to 3.

Figure 3:
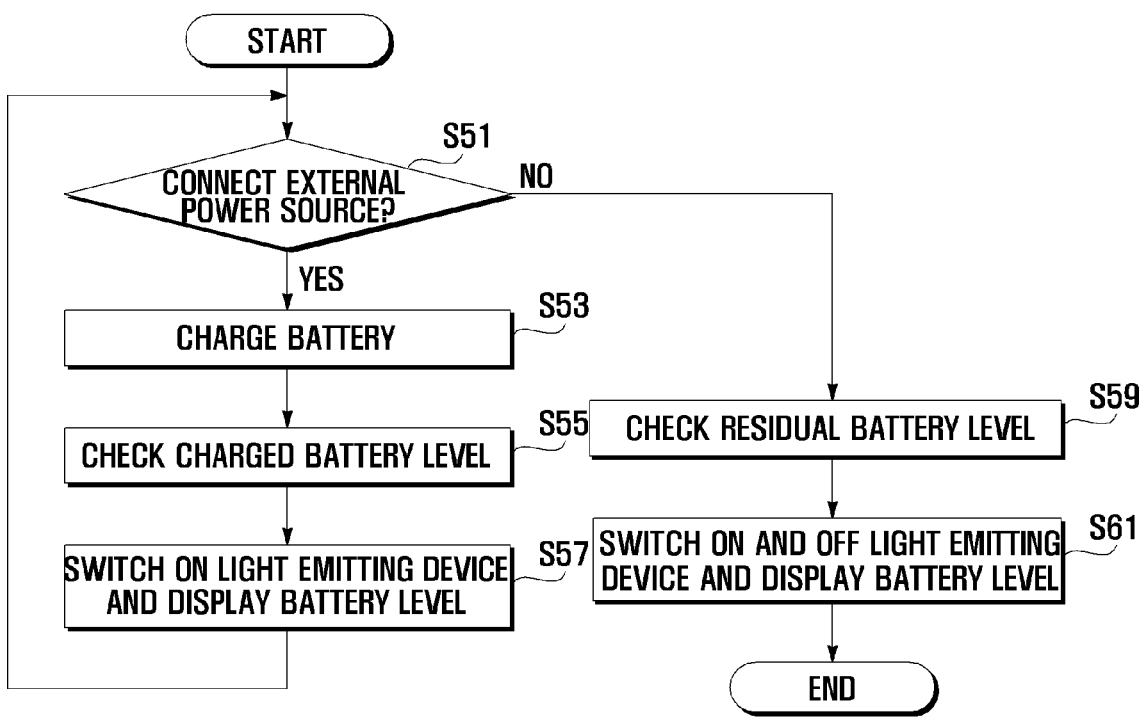
FIG. 3 is a flowchart illustrating a battery status indication method according to an exemplary embodiment of the present invention.

FIG. 3 is a flowchart illustrating a battery status indication method according to an exemplary embodiment of the present invention.

Referring to FIG. 3, the control unit 11 of the wireless headset 10 may monitor to detect whether the power connector 17 is connected to an external power source in step S51. If the power connector 17 is connected to an external power source, then the control unit 11 may control such that the battery 15 may be charged with power supplied by the external power source in step S53. The battery 15 can be configured to be charged under the control of the control unit 11 or automatically when the power connector 17 is connected to the external power source.

If the battery is being charged, the control unit 11 may check the charge battery level in step S55 and may control such that the status indication unit 16 may switch on the light emitting device 16a to emit a color of light corresponding to the current battery charge level in step S57. For example, the control unit 11 may switch on the light emitting device 16a to emit the red light for indicating the low battery charge level, the purplish red light for indicating the middle battery charge level, and the blue light for indicating the full battery charge.

If the power connector 17 is not connected to an external power source, then the control unit 11 may check the residual battery level in step S59 and may control such that the status indication unit 16 may switch on and off the light emitting device 16a to blink a color light corresponding to the current residual battery level in step S61.

At step S61, as the residual battery level decreases, the control unit 11 may control such that the light emitting device 16a may change the color of light to match the current residual battery level. In order to distinguish the non-charging mode from the charging mode, the control unit 11 may control such that the light emitted from the light emitting device 16a blinks. For example, the control unit 11 may switch on an off the light emitting device 16a to blink the red light for indicating the low residual battery level, the purplish red light for indicating the middle residual battery level, and the blue light for indicating the high residual battery level.

The control unit 11 may also control such that the status indication unit 16 may display the radio status of the wireless communication unit 13 together with the residual battery status. In this case, the control unit 11 may control such that the light emitted by the light emitting device 16a may blink in correspondence with the radio scanning cycle of the wireless communication unit 13.

Although the battery status indication method according to this exemplary embodiment is configured to indicate the battery status and radio status using a single light emitting device, the present invention is not limited thereto. For example, the status indication unit 16 can be implemented with two or more light emitting devices for indicating the battery status and radio status, respectively.

Second Exemplary Embodiment

Figure 5:
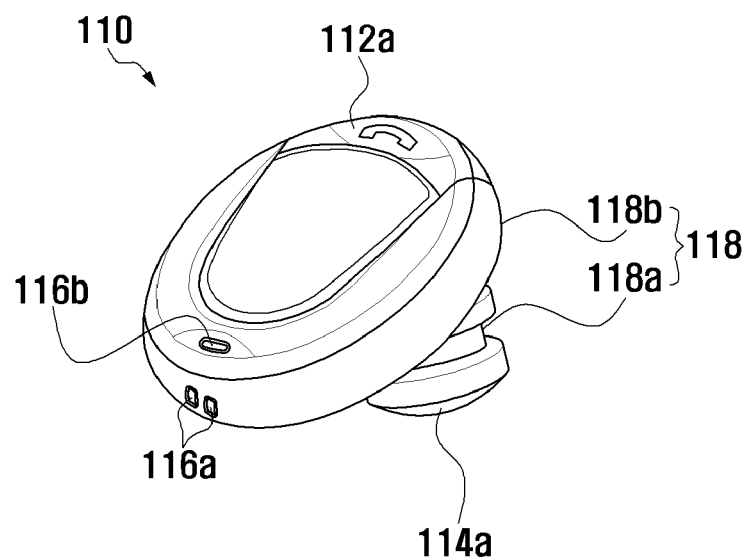
FIG. 5 is a perspective view illustrating the wireless headset of FIG. 4.
Figure 4:
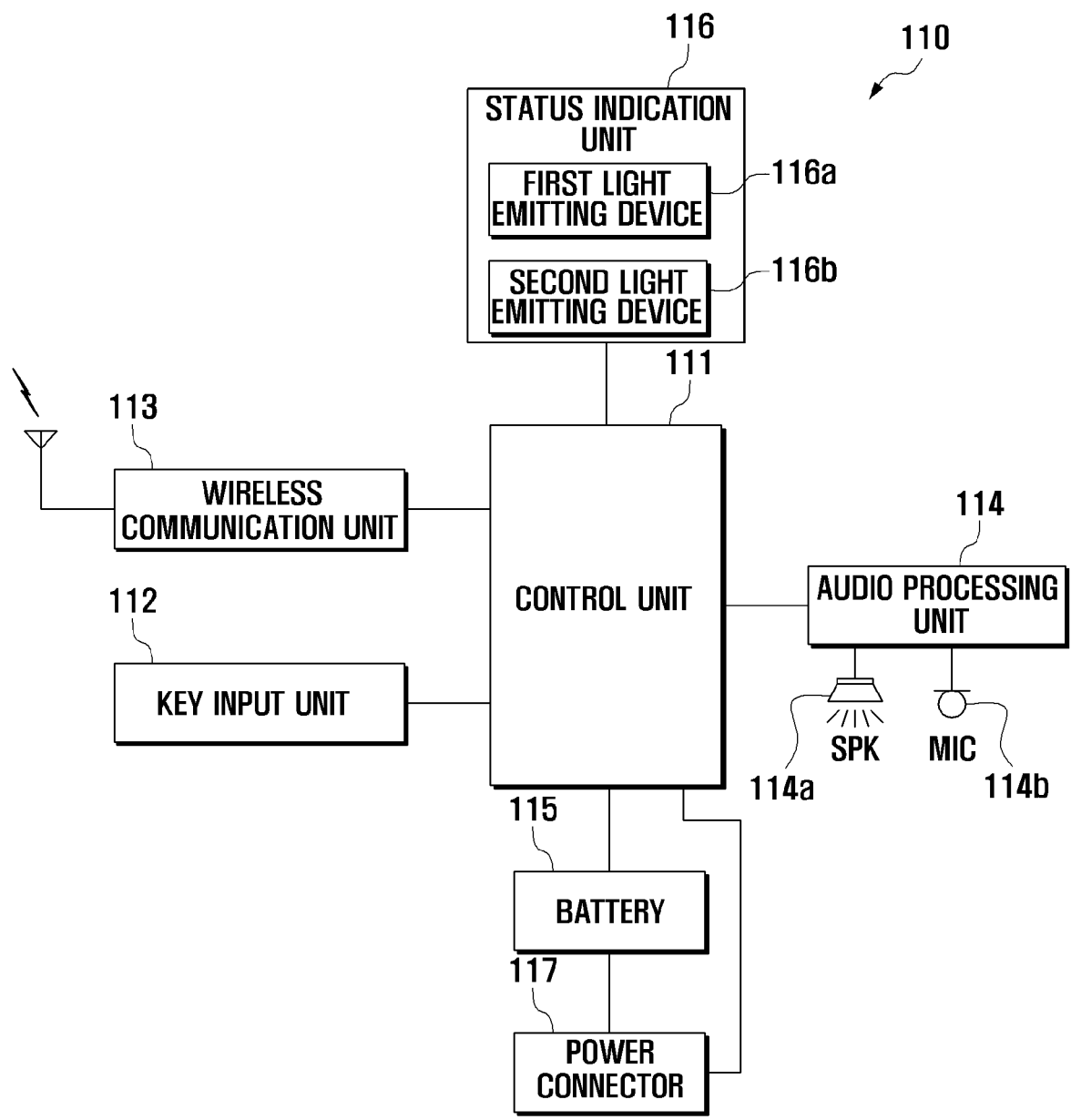
FIG. 4 is a block diagram illustrating a configuration of a wireless headset according to another exemplary embodiment of the present invention.

FIG. 4 is a block diagram illustrating a configuration of a wireless headset according to another exemplary embodiment of the present invention, and FIG. 5 is a perspective view illustrating the wireless headset of FIG. 4.

The structures of the wireless headset are similar to those of the wireless headset 100 depicted in FIG. 1 except that the status indication unit 116 is provided with two light emitting devices 116a and 116b. Accordingly, the description will be focused on the structure and function of the status indication unit 116.

illustrated in FIGS. 4 and 5, the wireless headset 110 includes a control unit 111, a key input unit 112, a wireless communication unit 113, an audio processing unit 114, a battery 115, a status indication unit 116, and a power connector 117 housed in a casing 118. The audio processing unit 114 includes a speaker 114a and a microphone 114b. The key input unit 112 may be provided with one or more keys 112a for manipulating the wireless headset 110.

More particularly in this exemplary embodiment, the status indication 116 is provided with a first light emitting device 116a for indicating the battery status and a second light emitting device 116b for indicating the radio status. The first and second light emitting devices 116a and 116b can be implemented with LEDs.

The first light emitting device 116a can be implemented with at least two LEDs each emitting a single color of light or one two color LED which can emit three different color lights. That is, the first light emitting device 116a is similar to the light emitting device 16a of FIG. 1 except that it is not configured to indicate the radio status of the wireless communication unit.

The control unit 111 may control such that the first light emitting device 116a may emit light constantly in the non-charging mode and may blink in the charging mode.

The second light emitting device 116b can be implemented with an LED emitting at least one color of light. The control unit 11 may control such that the second light emitting device 116b blinks in correspondence with the scanning cycle of the wireless communication unit 113.

The first and second light emitting devices 116a and 116b may be disposed to be exposed outside the casing 118. In this exemplary embodiment, the first and second light emitting devices 116a and 116b may be disposed on different walls of the casing 118. That is, the second light emitting device 116b may be mounted on a wall that opposes the supporting part 118b from which the ear bud is protruded, and the first light emitting device 116a may be mounted on a wall connecting the supporting part 118b and the wall opposing to the supporting part 118b. The first and second light emitting devices 116a and 116b may be disposed on different walls of the casing 118 for preventing confusion between battery status indication and radio status indication.

Although the first and second light emitting devices 116a and 116b are depicted on different walls of the casing 118 in FIG. 5, the positions of the light emitting devices are not limited thereto. For example, the first and second light emitting devices can be installed on the same wall of the casing.

While the present invention has been described with reference to certain exemplary embodiments thereof, it will understood by those skilled in the art that that various changes in form and details may be made therein without departing from the spirit and scope of the present invention as defined in the appended claims and their equivalents.

As described above, the wireless headset and battery status indication method thereof enables simultaneous indication of a battery status and whether the wireless headset is operating in charging mode.

Also, the wireless headset and battery status indication method thereof control the blinking of the battery status indication light in correspondence with radio scanning cycle of the wireless communication unit, thereby indicating the radio status as well as the battery status.

What is claimed is:

1. A battery status indication method for a wireless headset, the method comprising:
    determining a residual charge of a battery of the wireless headset; and
    emitting light having one of a plurality of colors from a status indication unit of the wireless headset,
    wherein each of the plurality of colors indicates a different residual charge of the battery,
    wherein the light comprises a color corresponding to a current residual charge of the battery,
    wherein the emitting of the light comprises one of maintaining emission of the light and blinking of the light when the battery is coupled to an external power source, and
    wherein the emitting of the light comprises the other of maintaining the emission of the light and blinking of the light when the battery is not coupled to the external power source.

2. The method of claim 1, wherein the status indication unit comprises a first light emitting device that includes at least two light emitters that emit different colors of light.

3. The method of claim 2, wherein each of the plurality of colors of light is generated by combining the light emitted by at least one of the at least two light emitters.

4. The method of claim 1, wherein the status indication unit comprises a first light emitting device that includes one light emitter that emits at least three different colors of light.

5. The method of claim 1, wherein the blinking of the light corresponds to a radio scanning cycle of a wireless communication of the wireless headset.

6. The method of claim 1,
    wherein the status indication unit comprises a first light emitting device for emitting the light to indicate the residual charge of the battery, and
    wherein the status indication unit comprises a second light emitting device for emitting light to indicate a radio status of the wireless headset.

7. A wireless headset, the headset comprising:
    a wireless communication unit for establishing a short range wireless communication link with an external device;
    a control unit for controlling the wireless communication with the external device and for determining a residual battery charge of the wireless headset; and
    a status indication unit including a first light emitting device for emitting one of a plurality of colors of light based on a result of the determination of the residual battery charge,
    wherein each of the plurality of colors corresponds to a different residual battery charge,
    wherein the light comprises a color corresponding to a current residual charge of the battery emitted by the first light emitting device,
    wherein the control unit controls, when the wireless headset is electrically coupled to an external power source, the status indication unit to perform one of maintaining emission of the light and blinking the light, and
    wherein the control unit controls, when the wireless headset is not electrically coupled to the external power source, the status indication unit to perform the other of maintaining the emission of the light and blinking, of the light.

8. The headset of claim 7, wherein the first light emitting device comprises at least two light emitters that emit different colors of light.

9. The headset of claim 8, wherein the first light emitting device emits one of a first color of light generated by one light emitter, a second color of light generated by the other light emitter, and a third color of light generated by combining the first and second colors of light.

10. The headset of claim 7, wherein the first light emitting device comprises one light emitter that emits at least three different colors of light.

11. The headset of claim 7, wherein the control unit controls the status indication unit to blinks the light in correspondence with a radio scanning cycle of the wireless communication unit.

12. The headset of claim 7, wherein the status indication unit further comprises a second light emitting device for indicating a radio status of the wireless communication unit.

13. A battery status indication method for a portable electronic device, the method comprising:
    determining a residual charge of a battery of the device; and
    emitting light having one of a plurality of colors from a status indication unit of the device,
    wherein each of the plurality of colors indicates a different residual charge of the battery,
    wherein the light comprises a color corresponding to a current residual charge of the battery,
    wherein the emitting of the light comprises one of maintaining emission of the light and blinking of the light when the battery is coupled to an external power source,
    wherein the emitting of the light comprises the other of maintaining the emission of the light and blinking of the light when the battery is not coupled to the external power source.

14. The method of claim 13, wherein the status indication unit comprises a first light emitting device that includes at least two light emitters that emit different colors of light.

15. The method of claim 14, wherein each of the plurality of colors of light is generated by combining the light emitted by at least one of the at least two light emitters.

16. The method of claim 13, wherein the status indication unit comprises a first light emitting device that includes one light emitter that emits at least three different colors of light.

17. A portable electronic device comprising:
    a control unit for determining a residual battery charge of the device; and
    a status indication unit including a first light emitting device for emitting one of a plurality of colors of light based on a result of the determination of the residual battery charge,
    wherein each of the plurality of colors corresponds to a different residual battery charge,
    wherein the light comprises a color corresponding to a current residual charge of the battery emitted by the first light emitting device,
    wherein the control unit controls, when the portable electronic device is electrically coupled to an external power source, the status indication unit to perform one of maintaining emission of the light and blinking the light, and wherein the control unit controls, when the portable electronic device is not electrically coupled to the external power source, the status indication unit to perform the other of maintaining the emission of the light and blinking of the light.

18. The portable electronic device of claim 17, wherein the first light emitting device comprises at least two light emitters that emit different colors of light.

19. The portable electronic device of claim 18, wherein the first light emitting device emits one of a first color of light generated by one light emitter, a second color of light generated by the other light emitter, and a third color of light generated by combining the first and second colors of light.

20. The portable electronic device of claim 17, wherein the first light emitting device comprises one light emitter that emits at least three different colors of light.

21. The method of claim 1, wherein the status indication unit comprises a first light emitting device that includes at least N light emitters that collectively emit at least M different colors of light, where M and N are integers, N is an integer greater than or equal to (two), and M>N.

22. The headset of claim 7, wherein the first light emitting device comprises a first light emitting device that includes at least N light emitters that collectively emit at least M different colors of light, where M and N are integers, N is an integer greater than or equal to (two), and M>N.

23. The method of claim 13, wherein the status indication unit comprises a first light emitting device that includes at least N light emitters that collectively emit at least M different colors of light, where M and N are integers, N is an integer greater than or equal to (two), and M>N.

24. The portable electronic device of claim 17, wherein the first emitting device comprises a first light emitting device that includes at least N light emitters that collectively emit at least M different colors of light, where M and N are integers, N is an integer greater than or equal to (two), and M>N.

* * * * *